(12) United States Patent
Takeuchi et al.

(10) Patent No.: US 9,337,476 B2
(45) Date of Patent: May 10, 2016

(54) LITHIUM SULFIDE-CARBON COMPLEX, PROCESS FOR PRODUCING THE COMPLEX, AND LITHIUM ION SECONDARY BATTERY UTILIZING THE COMPLEX

(75) Inventors: Tomonari Takeuchi, Ikeda (JP); Hikari Sakaebe, Ikeda (JP); Tetsuo Sakai, Ikeda (JP); Kuniaki Tatsumi, Ikeda (JP); Hiroshi Senoh, Ikeda (JP); Hiroyuki Kageyama, Ikeda (JP); Mitsuharu Tabuchi, Ikeda (JP)

(73) Assignee: NATIONAL INSTITUTE OF ADVANCED INDUSTRIAL SCIENCE AND TECHNOLOGY, Tsukuba-shi (JP)

( * ) Notice: Subject to any disclaimer, the term of this patent is extended or adjusted under 35 U.S.C. 154(b) by 394 days.

(21) Appl. No.: 13/120,237

(22) PCT Filed: Aug. 24, 2009

(86) PCT No.: PCT/JP2009/064721
§ 371 (c)(1),
(2), (4) Date: Mar. 22, 2011

(87) PCT Pub. No.: WO2010/035602
PCT Pub. Date: Apr. 1, 2010

(65) Prior Publication Data
US 2011/0171537 A1    Jul. 14, 2011

(30) Foreign Application Priority Data

Sep. 24, 2008  (JP) ................................. 2008-243679
May 22, 2009  (JP) ................................. 2009-123686

(51) Int. Cl.
*H01M 10/056* (2010.01)
*H01M 10/058* (2010.01)
(Continued)

(52) U.S. Cl.
CPC .............. *H01M 4/136* (2013.01); *C01B 17/22* (2013.01); *C01B 31/00* (2013.01); *H01M 4/043* (2013.01);
(Continued)

(58) Field of Classification Search
None
See application file for complete search history.

(56) References Cited

U.S. PATENT DOCUMENTS

| 6,013,390 A * | 1/2000 | Kimiya et al. ................. 429/206 |
| 6,432,579 B1 * | 8/2002 | Tsuji et al. ................. 429/218.1 |
| 2005/0181277 A1 | 8/2005 | Koga et al. |

FOREIGN PATENT DOCUMENTS

| JP | 6-275313 A | 9/1994 |
| JP | 2005-011696 A | 1/2005 |

(Continued)

OTHER PUBLICATIONS

Hayashi, Akitoshi et al.; "Electrochemical performance of all-solid-state lithium batteries with mechanochemically activated Li2S—Cu composite electrodes"; Solid State Ionics, vol. 179, (2008), pp. 1702-1705.

(Continued)

*Primary Examiner* — Barbara Gilliam
*Assistant Examiner* — Stephan Essex
(74) *Attorney, Agent, or Firm* — Westerman, Hattori, Daniels & Adrian, LLP (57) ABSTRACT

The present invention provides a process for producing a lithium sulfide-carbon composite, the process comprising placing a mixture of lithium sulfide and a carbon material having a specific surface area of 60 m$^2$/g or more in an electrically-conductive mold in a non-oxidizing atmosphere, and applying a pulsed direct current to the mold while pressurizing the mixture in a non-oxidizing atmosphere, thereby subjecting the lithium sulfide and the carbon material to heating reaction; and a lithium sulfide-carbon composite obtained by this process, the composite having a carbon content of 15 to 70 weight %, and a tap density of 0.4 g/cm$^3$ or more when the carbon content is 30 weight % or more, or a tap density of 0.5 g/cm$^3$ or more when the carbon content is less than 30 weight %. The present invention can improve the electronic conductivity of lithium sulfide, which is expected to be put into practical use as a high-capacity positive electrode active material, so as to further enhance the performance of lithium sulfide as a positive electrode active material for lithium ion secondary batteries.

3 Claims, 6 Drawing Sheets

(51) Int. Cl.

| | |
|---|---|
| *H01M 4/136* | (2010.01) |
| *C01B 17/22* | (2006.01) |
| *C01B 31/00* | (2006.01) |
| *H01M 4/04* | (2006.01) |
| *H01M 4/133* | (2010.01) |
| *H01M 4/1393* | (2010.01) |
| *H01M 4/1397* | (2010.01) |
| *H01M 4/58* | (2010.01) |
| *H01M 4/587* | (2010.01) |
| *H01M 10/0525* | (2010.01) |

(52) U.S. Cl.
CPC ............ *H01M 4/0438* (2013.01); *H01M 4/133* (2013.01); *H01M 4/1393* (2013.01); *H01M 4/1397* (2013.01); *H01M 4/581* (2013.01); *H01M 4/587* (2013.01); *C01P 2002/72* (2013.01); *C01P 2006/11* (2013.01); *C01P 2006/12* (2013.01); *C01P 2006/40* (2013.01); *Y02E 60/122* (2013.01); *Y02P 70/54* (2015.11)

(56) References Cited

FOREIGN PATENT DOCUMENTS

| JP | 2005-259629 A | 9/2005 |
| JP | 2006-032143 A | 2/2006 |
| JP | 2006-164779 A | 6/2006 |
| JP | 2008-257962 A | 10/2008 |
| JP | 2009-009905 A | 1/2009 |
| JP | 2009-064667 A | 3/2009 |

OTHER PUBLICATIONS

Hayashi, Akitoshi et al.; "All-solid-state rechargeable lithium batteries with Li2S as a positive electrode material"; Journal of Power Sources, vol. 183, (2008), pp. 422-426.

Obrovac, M. N. et al.; "Electrochemically Active Lithia/Metal and Lithium Sulfide/Metal Composites"; Electrochemical and Solid-State Letter, vol. 5 No. 4, pp. A70-A73, (2002).

International Serarch Report of PCT/JP2009/064721, date of mailing Nov. 10, 2009.

* cited by examiner

LITHIUM SULFIDE-CARBON COMPLEX, PROCESS FOR PRODUCING THE COMPLEX, AND LITHIUM ION SECONDARY BATTERY UTILIZING THE COMPLEX

TECHNICAL FIELD

The present invention relates to a composite of lithium sulfide and carbon, a process for producing the composite, and use of the composite.

BACKGROUND ART

As portable electronic devices, hybrid vehicles, etc., have higher performance in recent years, secondary batteries (particularly lithium ion secondary batteries) used therein are increasingly required to have higher capacity. For current lithium ion secondary batteries, the development of higher-capacity positive electrodes is behind the development of higher-capacity negative electrodes. Even lithium nickel oxide-based materials, which are said to have relatively high capacity, have a capacity of about 190 to 220 mAh/g.

In contrast, sulfur, which has a theoretical capacity as high as about 1,670 mAh/g, is a promising candidate for a high-capacity electrode material. However, elemental sulfur has low electronic conductivity, and does not contain lithium; therefore, lithium or lithium-containing alloys must be used in negative electrodes. Thus, there are problematically fewer options for negative electrodes.

Comparatively, lithium sulfide, which contains lithium, allows for the use of graphite, silicon, and other alloys in negative electrodes, providing many more options for negative electrodes. Further, dangers such as short circuit due to the production of dendrites caused by the use of metallic lithium can be avoided. However, lithium sulfide also has the problem of low electronic conductivity, and it is known that charge and discharge hardly occur only by mixing lithium sulfide with a carbon powder, which is a conductive material (Non-Patent Document 1, listed later). For this reason, techniques of imparting electronic conductivity to lithium sulfide are essential to improve the performance of sulfur-based positive electrode materials.

In an attempt to increase the electronic conductivity of lithium sulfide, Non-Patent Documents 2 and 3, listed later, report a method of combining lithium sulfide with a copper powder, which is used as a conductive material. According to this method, however, such a copper powder and other transition metal powders, which are generally heavier than lithium sulfide, may cause a reduction in battery energy density per weight. Additionally, copper powder is more expensive per weight than carbon powder, resulting in increased costs of batteries. Therefore, carbon powder is more advantageous from the standpoint of industrial production; however, there have been no reports on the combination of lithium sulfide with carbon.

As for the combination of elemental sulfur with carbon, for example, Patent Document 1, listed later, discloses a method of subjecting sulfur and carbon to mechanical milling in an air atmosphere; however, there have been no reports on the production of lithium sulfide-carbon composites by such a dry process. Further, Patent Document 2, listed later, reports a method for depositing lithium polysulfide (e.g., $Li_2S_{12}$) on carbon by liquid-phase reaction; however, there have been no reports on a method of combining lithium sulfide ($Li_2S$) with carbon.

PRIOR ART DOCUMENTS

Patent Documents

Patent Document 1: Japanese Unexamined Patent Publication No. 2006-164779
Patent Document 2: Japanese Unexamined Patent Publication No. 6-275313

Non-Patent Documents

Non-Patent Document 1: M. N. Obrovac and J. R. Dahn, Electrochemical Solid-Statei Lett., 5, A70 (2002)
Non-Patent Document 2: A. Hayashi, R. Ohtsubo, T. Ohtomo, F. Mizuno, and M. Tatsumisago, J. Power Sources, 183, 422 (2008)
Non-Patent Document 3: A. Hayashi, R. Ohtsubo, M. Tatsumisago, Solid State Ionics, 179, 1702 (2008)

SUMMARY OF THE INVENTION

Technical Problem

The present invention has been made in view of the current state of the above prior art. A primary object of the present invention is to provide a process of improving the electronic conductivity of lithium sulfide, which is expected to be put into practical use as a high-capacity positive electrode active material, so as to further enhance the performance of lithium sulfide as a positive electrode active material for lithium ion secondary batteries. Another object of the present invention is to provide a novel lithium ion secondary battery that can effectively use the excellent performance of a positive electrode active material obtained by the production process of the present invention.

Technical Solution

The present inventors conducted extensive research to achieve the above objects. As a result, the inventors found that when lithium sulfide and a carbon material are used as starting materials, a dense composite of lithium sulfide and carbon material that are firmly bonded to each other can be obtained by placing the starting materials in a conductive container, and applying a pulsed direct current thereto in a non-oxidizing atmosphere with low moisture content to perform a heating reaction while pressurizing the starting materials. The inventors also found that when this composite is used as a positive electrode active material of a lithium ion secondary battery, the composite has improved electronic conductivity, and thus exhibits excellent performance as a high-capacity positive electrode active material for lithium secondary batteries. The inventors also found that particularly when the composite is used as a positive electrode active material of an all-solid-state lithium secondary battery whose electrolyte is a lithium ion conductive solid electrolyte, charge/discharge efficiency can be greatly enhanced by utilizing the excellent performance of the composite. The present invention was accomplished based on these findings.

More specifically, the present invention provides the following lithium sulfide-carbon composite, process for producing the same, and use thereof.

Item 1. A lithium sulfide-carbon composite comprising lithium sulfide and a carbon material bonded together, the composite having a carbon content of 15 to 70 weight %, and a tap density of 0.4 g/cm$^2$ or more when the carbon content is 30 weight % or more, or a tap density of 0.5 g/cm² or more when the carbon content is less than 30 weight %.

Item 2. A process for producing the lithium sulfide-carbon composite according to Item 1, the process comprising:

placing a mixture of lithium sulfide and a carbon material having a specific surface area of 60 m²/g or more in an electrically-conductive mold in a non-oxidizing atmosphere; and applying a pulsed direct current to the mold while pressurizing the mixture in a non-oxidizing atmosphere, thereby subjecting the lithium sulfide and the carbon material to heating reaction.

Item 3. The process according to Item 2, wherein the carbon material is acetylene black, and the amount of carbon material used is 15 to 70 weight % based on the total amount of lithium sulfide and carbon material.

Item 4. The process according to Item 2 or 3, wherein the reaction is carried out at 700 to 1,400° C. under a pressure of 10 MPa or greater.

Item 5. A positive electrode active material for a lithium ion secondary battery comprising the lithium sulfide-carbon composite according to Item 1.

Item 6. A lithium ion secondary battery comprising the positive electrode active material according to Item 5 as a constituent component.

Item 7. An all-solid-state lithium ion secondary battery comprising the positive electrode active material according to Item 5 and a lithium ion conductive solid electrolyte as constituent components.

Item 8. The all-solid-state lithium ion secondary battery according to Item 7, wherein the lithium ion conductive solid electrolyte is a solid electrolyte comprising an inorganic compound containing sulfur as a constituent element.

The process of the present invention for producing a lithium sulfide-carbon composite is described in detail below.

Starting Material

In the present invention, lithium sulfide and a carbon material are used as starting materials.

Lithium sulfide is represented by the formula: $Li_2S$. Although the form of lithium sulfide is not particularly limited, it is generally preferable to use lithium sulfide in a powder form with an average particle diameter of about 1 to 50 µm. The average particle diameter as used in this specification is a particle diameter with a cumulative size-distribution of 50% measured using a dry-type laser diffraction-scattering method.

As a carbon material, it is preferable to use those having a specific surface area of about 60 m²/g or more, and more preferably about 65 m²/g or more. The use of such a carbon material with a large specific surface area, i.e., ultrafine carbon powder, produces composites with a denser conductive network, and reduces lithium sulfide particles isolated from the conductive network. As a result, the number of lithium sulfide particles usable as active materials increases, and high capacity can be expected.

The upper limit of the specific surface area is not particularly limited; however, it may generally be about 300 m²/g or less. A carbon powder with a specific surface area larger than this range has a sphere-equivalent particle diameter of 10 nm or less. Such a powder is difficult to handle because of particle scattering etc., making the process of forming a composite complicated. The specific surface area as used in this specification is a BET-specific surface area measured by a nitrogen adsorption method.

Preferable carbon materials that satisfy the above requirements are acetylene black, Ketjenblack, VGCF (vapor-grown carbon fibers), coke-based carbon fibers, pitch-based carbon fibers, and the like.

As for the mixing ratio of lithium sulfide and carbon material, the amount of carbon material is preferably about 15 to 70 weight %, more preferably about 30 to 70 weight %, and even more preferably about 33 to 67 weight %, based on the total amount of lithium sulfide and carbon material (100 weight %).

In this range, when the carbon material content is lower (e.g., about 15 to 30 weight %), particularly in the production of composites with lithium sulfide, few by-products such as lithium carbonate are produced; and composite materials for positive electrode having a high energy density per weight and volume, as well as an excellent conductive network, can be obtained.

Process for Producing Lithium Sulfide-Carbon Composite

The process of the present invention for producing a lithium sulfide-carbon composite is carried out as follows. First, the starting materials, i.e., lithium sulfide and a carbon material, are sufficiently mixed in a non-oxidizing atmosphere, and then placed in an electrically-conductive mold. Thereafter, the mixture of the starting materials is sintered by an electric current sintering process in which a pulsed direct current is applied to the mold, while pressurizing the mixture in a non-oxidizing atmosphere. This process is called spark plasma sintering, pulse-current sintering, plasma-activated sintering, or the like. Thus, the target high-density lithium sulfide-carbon composite can be obtained.

More specifically, the mixture of the starting materials, lithium sulfide and a carbon material, is placed in an electrically-conductive mold having a predetermined shape in a non-oxidizing atmosphere, and an on-off pulsed direct current is applied to the mold while pressurizing the mixture in a non-oxidizing atmosphere, thereby performing electric current sintering under increased pressure.

For performing electric current application treatment, any apparatus can be used as long as it can pressurize the starting materials (lithium sulfide and carbon material), apply a current sufficient to produce discharge, and control the inside of the container containing the starting materials to a predetermined atmosphere. For example, a commercially available electric current sintering apparatus (spark plasma sintering apparatus) can be used. Such an electric current sintering apparatus and its operating principle are disclosed, for example, in Japanese Unexamined Patent Publication No. 10-251070.

Figure 1:
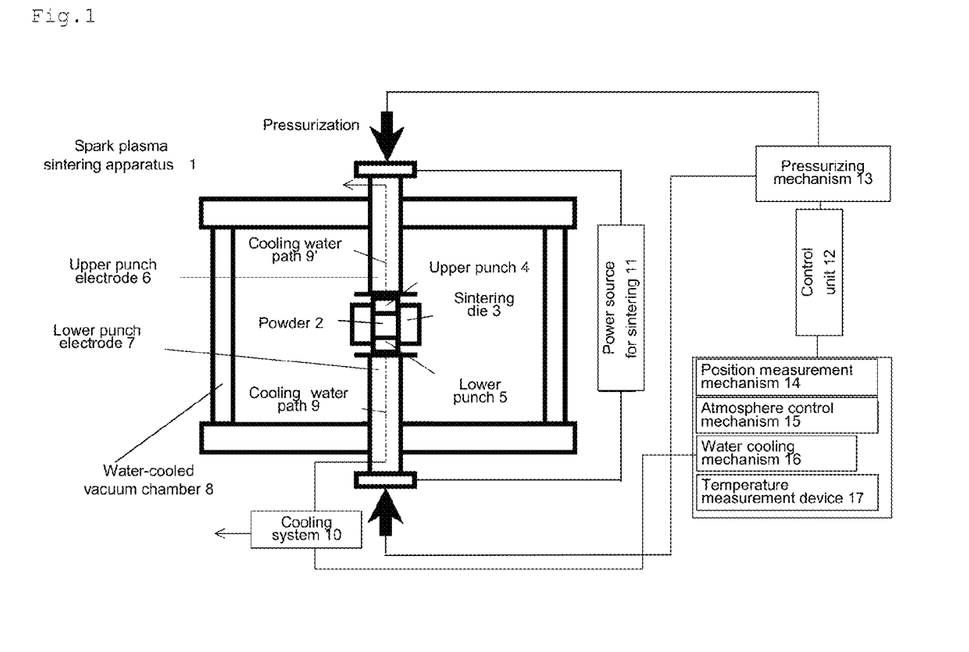
FIG. 1 schematically shows an example of a spark plasma sintering apparatus.

The following describes the process for producing a lithium sulfide-carbon composite with reference to FIG. 1 showing a schematic diagram of an example of a spark plasma sintering apparatus.

The spark plasma sintering apparatus 1 shown in FIG. 1 comprises an electrically-conductive mold (die) 3 in which a starting material mixture 2 is placed, and a pair of upper and lower punches 4 and 5. The punches 4 and 5 are respectively supported by punch electrodes 6 and 7, through which a pulsed current is applied while the starting material mixture 2 placed in the electrically-conductive mold (die) 3 is pressurized.

The electrically-conductive mold (die) in which the starting materials are placed can be made of materials that have electronic conductivity and are less likely to react with lithium sulfide. Examples of the material of the mold include carbon, cemented carbide (e.g., tungsten carbide), mixtures thereof, mixtures obtained by adding thereto reinforcers, such as silicon nitride, and the like, which may suitably be used in combination.

Mixing the starting materials and placing the resulting mixture in the mold are performed in a non-oxidizing atmosphere. The non-oxidizing atmosphere may be, for example, a reduced pressure atmosphere with a sufficiently low oxygen concentration; however, it is preferable to use an inert gas atmosphere, such as an Ar or $N_2$ atmosphere, and more preferably an Ar atmosphere. In this case, the atmosphere preferably has low moisture content, and particularly preferably has a dew point of about −60° C. or less.

The heating reaction of lithium sulfide and carbon material must also be performed in a non-oxidizing atmosphere. The non-oxidizing atmosphere may be, for example, a reduced pressure atmosphere with a sufficiently low oxygen concentration; however, it is preferable to use an inert gas atmosphere, such as an Ar or $N_2$ atmosphere, and more preferably an Ar atmosphere, such as when the starting materials are placed in the mold.

In the apparatus shown in FIG. 1, a current-carrying unit including the electrically-conductive mold 3, punches 4 and 5 for carrying electric current, and punch electrodes 6 and 7 is placed in a water-cooled vacuum chamber 8. The inside of the chamber can be controlled to a predetermined atmosphere by an atmosphere control mechanism 15. Thus, the inside of the chamber may be controlled to a non-oxidizing atmosphere using the atmosphere control mechanism 15.

A control unit 12 controls the driving of a pressurizing mechanism 13, a pulse power source 11, the atmosphere control mechanism 15, water cooling mechanisms 16 and 10, and a temperature measurement device 17. The control unit 12 is configured to drive the pressurizing mechanism 13 so that the punch electrodes 6 and 7 pressurize the starting material mixture at a predetermined pressure.

During the electric current application treatment, the mixture of lithium sulfide and carbon material (starting materials) is pressurized at a pressure of about 10 MPa or more, and preferably about 30 MPa or more. An overly low pressure is not preferable because particles of lithium sulfide and carbon material are insufficiently bonded to each other. The upper limit of the pressure is not particularly limited; however, it is generally about 500 MPa, and preferably about 450 MPa.

The heating temperature during the electric current application treatment varies depending on the particle diameter of lithium sulfide and carbon material (starting materials), the surface condition of the particles, and other conditions; however, it is generally about 600° C. or more, and preferably about 700° C. or more. An overly low heating temperature is not preferable because particles of lithium sulfide and carbon material are insufficiently bonded to each other. The upper limit of the heating temperature is not particularly limited. For example, excellent composites can be obtained even at a heating temperature of about 1,400° C.

In the present invention, particularly when the heating temperature is about 600 to 1,000° C., the composite has properly improved electronic conductivity and thus exhibits excellent performance as a high-capacity positive electrode active material for lithium secondary batteries. Specifically, at a heating temperature of about 700 to 900° C., high-performance positive electrode active materials can be obtained.

As a pulse current to be applied for heating, for example, an on-off pulsed direct current at a pulse width of about 2 to 3 milliseconds and a frequency of about 3 to 300 Hz can be used. The current value varies depending on the type and size of the mold, the heating rate, and other conditions; thus, the current value may be increased or decreased while the temperature of the mold is monitored, and may be controlled so that the temperature reaches a predetermined level. For example, when a graphite mold having an inner diameter of about 15 mm is heated at a temperature increase rate of 10° C./min, the current value is preferably about 100 to 600 A; and when the mold is heated at a temperature increase rate of 200° C./min, the current value is preferably about 100 to 1,000 A. In addition, when a mold having an inner diameter of about 100 mm is heated at a temperature increase rate of 10° C./min, the current value is preferably about 1,000 to 8,000 A.

The sintering time of electric current sintering cannot be generalized because it depends on the amount of starting materials used, sintering temperature, and other conditions; however, heating may generally be continued until the temperature reaches the above heating temperature range. When the temperature reaches the above range, cooling may be immediately performed, or the temperature may be maintained within this range, for example, up to about 2 hours.

When electric current sintering is carried out under pressurization by applying a pulsed direct current in the above-described manner, discharge generated between particles of the packed lithium sulfide and carbon material is used to promote the bonding between the particles; specifically, cleaning and activation effect of the particle surfaces due to discharge plasma, discharge impact pressure, etc., electric field diffusion effects caused by electric field, thermal-diffusion effects caused by Joule heat, plastic deformation pressure caused by pressurization, etc., serve as the driving force for the bonding. Consequently, a high-density composite of lithium sulfide and carbon material can be obtained. The obtained lithium sulfide-carbon composite is taken out from the mold after cooling, and is slightly pulverized, for example, in a mortar. Thus, a powder of the high-density sulfide lithium-carbon composite can be collected.

The electric current sintering treatment can be carried out on a larger scale by using a larger-size mold while scaling up the above process.

Lithium Sulfide-Carbon Composite

The lithium sulfide-carbon composite obtained by the above process is highly dense because the particles of the starting materials (lithium sulfide and carbon) are firmly bonded to each other, and has an excellent conductive network. Therefore, when used as a positive electrode active material for lithium secondary batteries, the composite has higher electronic conductivity and thus exhibits excellent performance as a high-capacity positive electrode active material.

The lithium sulfide-carbon composite obtained by the above process is a high-density composite containing 15 to 70 weight % of carbon based on the total amount of product (100 weight %), as with the proportion of the starting materials. However, lithium sulfide partially decomposes during electric current sintering, and lithium isolated from the sulfur atom reacts with carbon and a small amount of remaining oxygen to produce lithium carbonate, which may finally remain in the resulting lithium sulfide-carbon composite. In this case, lithium sulfide decreases in an amount corresponding to the amount of produced lithium carbonate. Lithium carbonate in an amount of about 5 weight % or less has little effect on charge/discharge performance. Particularly, a composite having a carbon content of about 15 to 30 wt. % produces only a small amount of lithium carbonate uninvolved in charge and discharge, and thus can be used as a high-capacity positive electrode active material.

The obtained composite, in which the lithium sulfide and carbon material are firmly bonded to each other, has a remarkably higher density than the starting material mixture. When the carbon content is 30 weight % or more, the density is about 0.4 g/cm$^3$ or more; and when the carbon content is less than 30 weight %, the density is about 0.5 g/cm$^3$ or more; no conventional composite has such a high density. Accordingly, when used as a positive electrode active material for lithium secondary batteries, the composite exhibits excellent conductivity and has a high-volumetric energy density. The upper limit of the tap density is not particularly limited, and varies depending on the temperature and pressures during pressurized electric current sintering, and other conditions; however, the tap density is generally about 1.0 g/cm$^3$ or less.

The tap density as used in this specification is determined as follows. A sample is pulverized by hand in a mortar etc. in a non-oxidizing atmosphere with low moisture content at a dew point of –60° C. or less. The pulverized sample is passed through a sieve with openings having a size of 100 µm. Then, about 0.2 to 1.0 g of the sample is placed in a 10-mL graduated cylinder, and subjected to tapping 100 times. The tap density is then measured.

The lithium sulfide-carbon composite obtained by the process of the present invention can be effectively used as a positive electrode active material for lithium ion secondary batteries. Lithium ion secondary batteries using the composite can be produced by a known process. More specifically, a lithium ion secondary battery using the composite obtained by the process of the present invention as a positive electrode active material may be assembled by a standard method using a known negative electrode material, such as metallic lithium, carbon-based material (activated carbon, graphite, etc.), or the like; a known electrolyte such as a solution in which a lithium salt (lithium perchlorate, LiPF$_6$, etc.) is dissolved in a solvent (ethylene carbonate, dimethyl carbonate, etc.); and other known battery constituents.

Particularly, for a composite having a low carbon content (e.g., about 15 to 30 weight %), tetraethylene glycol dimethyl ether or the like in which lithium bis(trifluoromethylsulfonyl) imide (LiTFSI) or the like is dissolved is preferably used as an electrolyte. The use of such an electrolyte produces a lithium ion secondary battery that exhibits excellent performance, even when a composite having a lower carbon content is used.

Moreover, when the lithium sulfide-carbon composite of the present invention is used as a positive electrode active material, an all-solid-state lithium ion secondary battery can be obtained using a lithium ion conductive solid electrolyte as an electrolyte. In this case, only lithium ions, which are the sole movable ions in the solid electrolyte, are involved in the electrode reaction. Accordingly, unlike batteries using a liquid electrolyte, side reactions caused by counter anions or solvents hardly occur, and self-discharge is very low. For this reason, in addition to the excellent conductivity and high capacity of the composite of the present invention, charge/discharge efficiency can be significantly enhanced, compared with batteries using a liquid electrolyte. Moreover, dissolution of positive electrode active material components into a liquid electrolyte, particularly dissolution of a sulfur component into a liquid electrolyte, which is problematic in a sulfur-based positive electrode active material, can be prevented by using a solid electrolyte; and cycle performance is greatly improved. Furthermore, because of the use of a nonflammable solid electrolyte, there is another advantage of dramatically improved safety, compared with batteries using a flammable liquid electrolyte. When the lithium sulfide-carbon composite of the present invention is used as a positive electrode active material of an all-solid-state lithium ion secondary battery, the composite preferably comprises about 33 to 67 weight % of carbon material based on the total amount of lithium sulfide and carbon material (100 weight %). Thereby, the composite can be used as a high-capacity positive electrode active material.

All-solid-state lithium ion secondary batteries using a lithium ion conductive solid electrolyte can be produced by known methods disclosed, for example, in the following documents:

Japanese Unexamined Patent Publication No. 8-162151
Japanese Unexamined Patent Publication No. 2004-265685
Japanese Unexamined Patent Publication No. 2008-27581
Japanese Unexamined Patent Publication No. 2008-270137
K. Iwamoto, N. Aotani, K. Takada, and S. Kondo, Solid State Ionics, 79, 288 (1995)
H. Takahara, T. Takeuchi, M. Tabuchi, H. Kageyama, Y. Kobayashi, Y. Kurisu, S. Kondo, and R. Kanno, J. Electrochem. Soc., 151, A1539 (2004)
H. Okamoto, S. Hikazudani, C. Inazumi, T. Takeuchi, M. Tabuchi, and K. Tatsumi, Electrochemical Solid-State Lett., 11, A97 (2008)

For example, the composite of the present invention is used as a positive electrode active material; a known negative electrode active material, such as metallic indium or carbon-based material (e.g., graphite), may be used as a negative electrode material; and $Li_3PO_4$—$Li_2S$—$SiS_2$, $Li_2S$—$P_2S_5$, $Li_{4-x}Ge_{1-x}P_xS_4$ (0<x<1), $LiTi_2(PO_4)_3$, (Li,La)TiO$_3$, or the like, which are lithium ion conductive solid electrolytes known as solid electrolytes of all-solid-state lithium ion secondary batteries, may be used as a solid electrolyte. Additionally, when $Li_{4-x}Ge_{1-x}P_xS_4$ (0<x<1), which undergoes less chemical reaction with lithium metal, is used as a solid electrolyte, metallic lithium can be used as a negative electrode active material.

In the present invention, among the above lithium ion conductive solid electrolytes, $Li_3PO_4$—$Li_2S$—$SiS_2$, $Li_2S$—$P_2S_5$, $Li_{4-x}Ge_{1-x}P_xS_4$, and other solid electrolytes comprising sulfide-containing inorganic compounds are particularly preferred.

As other battery constituents, known materials for constituting all-solid-state lithium ion secondary batteries can be used to assemble an all-solid-state battery according to a known method.

For example, according to the method disclosed in H. Okamoto, S. Hikazudani, C. Inazumi, T. Takeuchi, M. Tabuchi, and K. Tatsumi, Electrochemical Solid-State Lett., 11, A97 (2008), a mixture of the composite of the present invention and a solid electrolyte is used as a positive electrode material, and the mixture is laminated with a solid electrolyte, a negative electrode (indium foil), a current collector (titanium foil), etc., thereby producing an all-solid-state lithium ion secondary battery.

Advantageous Effects of the Invention

The lithium sulfide-carbon composite of the present invention, in which the lithium sulfide and carbon material are firmly bonded to each other, improves the electronic conductivity of lithium sulfide, and can be effectively used as a lithium ion secondary battery positive electrode active material having excellent conductivity and high capacity.

Moreover, the production process of the present invention using an electric current sintering process can easily produce the above lithium sulfide-carbon composite having excellent performance. Therefore, the process of the present invention is highly useful for the production of positive electrode active materials for lithium ion secondary batteries.

Particularly, when the lithium sulfide-carbon composite of the present invention is used as a positive electrode active material of an all-solid-state lithium ion secondary battery, charge/discharge efficiency, cycle performance, etc. can be significantly enhanced, thereby producing a highly safe lithium ion secondary battery.

DESCRIPTION OF EMBODIMENTS

The present invention is described in detail below with reference to Examples and Comparative Examples. However, the present invention is not limited to the Examples.

Example 1

Lithium sulfide ($Li_2S$) (0.4 g; average particle diameter: 16 μm) and 0.2 g of acetylene black (AB) (specific surface area: 68 $m^2$/g) (lithium sulfide:acetylene black (weight ratio)=2:1) were weighed in a glove box in an argon gas atmosphere at a dew point of −68° C. They were put in a zirconia pot, and mixed by a planetary ball mill for about 30 minutes. The resulting mixture was placed in a graphite mold having an inner diameter of 15 mm in the glove box.

Subsequently, the graphite mold containing the starting materials was placed in an electric current sintering apparatus. The current-carrying unit including the graphite mold and electrodes was placed in a vacuum chamber. The inside of the chamber was degassed under vacuum (about 20 Pa), and highly pure argon gas (oxygen concentration: about 0.2 ppm) was charged into the chamber until the pressure reached atmospheric pressure.

Thereafter, a pulse current of about 900 A (pulse width: 2.5 milliseconds, frequency: 28.6 Hz) was applied to the graphite mold containing the starting materials while pressurizing the starting materials at about 30 MPa. The vicinity of the graphite mold was heated at a heating rate of about 200° C./min. When the temperature reached 900° C. after four and a half minutes from the start of the pulse current application, current application and pressurization were immediately stopped, and the resultant was naturally cooled.

After the temperature was cooled to room temperature, a graphite mold was moved to the glove box in an argon gas atmosphere at a dew point of −68° C., and a composite of lithium sulfide and acetylene black was taken out from the mold. All of the operations, including pulverization of samples, were conducted in the glove box.

Figure 2:
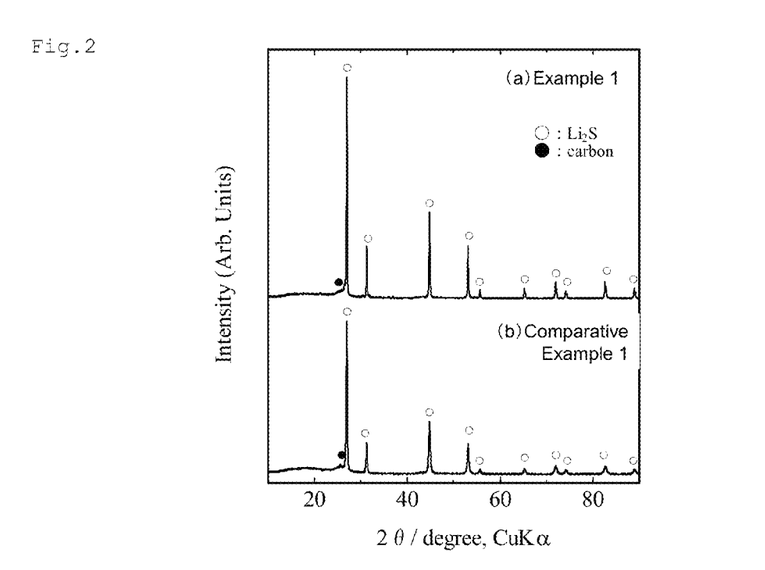
FIG. 2 shows X-ray diffraction patterns of samples obtained in Example 1 and Comparative Example 1.

FIG. 2 (a) shows an X-ray diffraction pattern of the obtained composite. As shown in FIG. 2 (a), peaks derived from $Li_2S$ and carbon were observed, confirming that the composite was composed of $Li_2S$ and carbon. The fact that the weight change before and after electric current sintering treatment was about 4% suggests that the weight ratio of both components was maintained as they were mixed.

The obtained composite was pulverized in the glove box in an argon gas atmosphere at a dew point of −68° C. Then, about 0.5 g of the pulverized composite was placed in a 10-mL graduated cylinder. After tapping 100 times, the density was measured. As a result, the tap density was 0.70 g/$cm^3$, which was much higher than the tap density of a starting material mixture before electric current sintering (0.37 g/$cm^3$) measured in Comparative Example 1, described later. This result indicated that lithium sulfide and carbon were bonded to each other to achieve a higher density.

Moreover, using the composite obtained in this manner as a positive electrode active material of a lithium ion secondary battery, lithium metal as a negative electrode, an aluminum mesh as a current collector, and a solution in which $LiPF_6$ was dissolved in an ethylene carbonate/dimethyl carbonate mixture as an electrolyte, a charge/discharge test was conducted by galvanostatic measurement at a current density of 46.7 mA/g and at a cutoff voltage of 1.0 to 3.0 V from the start of charging.

Figure 3:
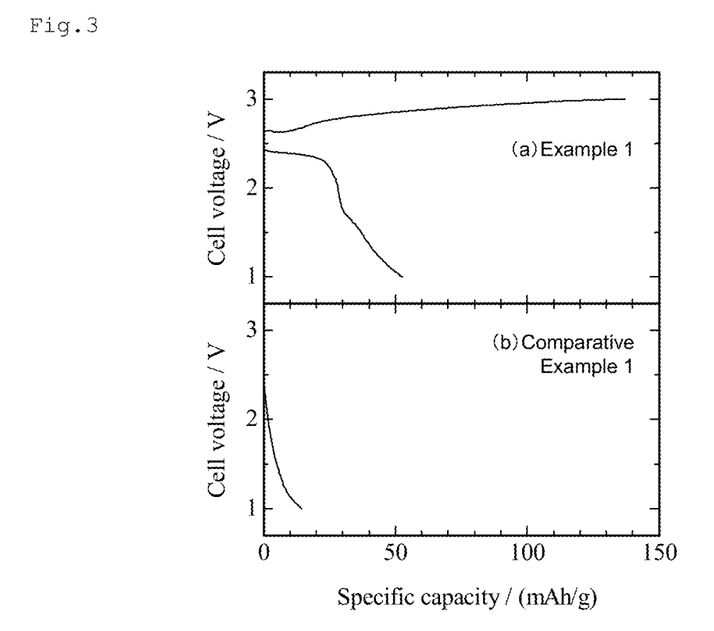
FIG. 3 shows charge/discharge performance of lithium ion secondary batteries comprising the samples obtained in Example 1 and Comparative Example 1 as positive electrode active materials.

The charge/discharge performance is as shown in FIG. 3 (a); that is, the initial charge capacity was about 140 mAh/g, and the initial discharge capacity was about 50 mAh/g. These were remarkably higher than those measured in Comparative Example 1, described later, in which a starting material mixture before electric current sintering was used as a positive electrode material (FIG. 3 (b); initial charge capacity: 0.2 mAh/g, and initial discharge capacity: 14 mAh/g).

The above results demonstrated that the utilization of lithium sulfide was greatly raised by combining lithium sulfide and carbon by electric current sintering under the conditions employed in the present invention.

Comparative Example 1

As with Example 1, 0.4 g of lithium sulfide ($Li_2S$) (average particle diameter: 16 μm) and 0.2 g of acetylene black (AB) (specific surface area: 68 $m^2$/g) (lithium sulfide:acetylene black (weight ratio)=2:1) were weighed in a glove box in an argon gas atmosphere. They were put in a zirconia pot, and mixed by a planetary ball mill for about 30 minutes.

FIG. 2 (b) shows an X-ray diffraction pattern of the resulting mixture measured without electric current sintering. As shown in FIG. 2 (b), peaks derived from $Li_2S$ and carbon are observed.

Moreover, the tap density of this mixture was measured in the same manner as in Example 1; the result was 0.37 g/cm$^3$, confirming that the mixture had a lower density than the composite obtained in Example 1.

Furthermore, the charge/discharge test was conducted in the same manner as in Example 1, except that this mixture was used as a positive electrode active material. The charge/discharge performance is as shown in FIG. 3 (b); that is, the initial charge capacity was about 0.2 mAh/g, and the initial discharge capacity was about 14 mAh/g. The initial charge capacity and initial discharge capacity were both much lower, compared with the case where the composite obtained in Example 1 was used as a positive electrode active material. These results revealed that carbon was not firmly bonded to lithium sulfide only by mixing using a planetary ball mill, thus failing to enhance the utilization of the active material.

Example 2

A lithium sulfide-carbon composite was produced in the same manner as in Example 1, except that 0.2 g of lithium sulfide (Li$_2$S) (average particle diameter: 16 µm) and 0.2 g of acetylene black (AB) (specific surface area: 68 m$^2$/g) (lithium sulfide:acetylene black (weight ratio)=1:1) were used as starting materials.

Figure 4:
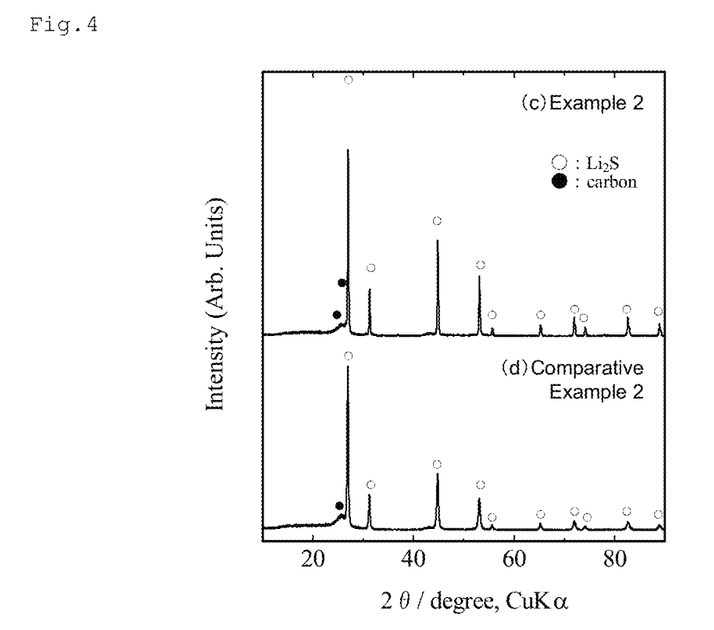
FIG. 4 shows X-ray diffraction patterns of samples obtained in Example 2 and Comparative Example 2.

FIG. 4 (a) shows an X-ray diffraction pattern of the obtained composite. As is clear from the X-ray diffraction pattern, peaks derived from Li$_2$S and carbon were observed, confirming that the obtained composite was composed of Li$_2$S and carbon. The fact that the weight change before and after electric current sintering treatment was about 4% suggests that the weight ratio of both components was maintained as they were mixed.

The tap density measured in the same manner as in Example 1 was 0.53 g/cm$^2$, which was much higher than the tap density of a starting material mixture before electric current sintering (0.35 g/cm$^2$) measured in Comparative Example 2, described later. This result indicated that lithium sulfide and carbon were bonded to each other to achieve a higher density.

Figure 5:
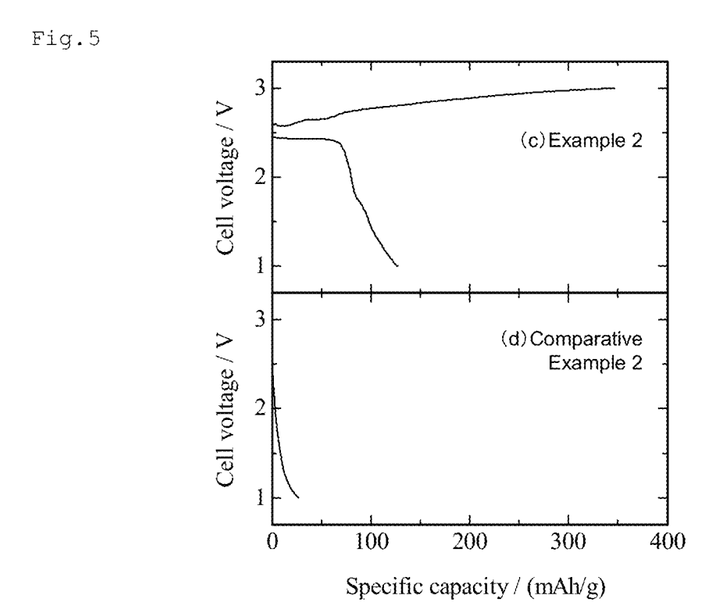
FIG. 5 shows charge/discharge performance of lithium ion secondary batteries comprising the samples obtained in Example 2 and Comparative Example 2 as positive electrode active materials.

Moreover, using the composite obtained in this manner as a positive electrode active material of a lithium ion secondary battery, the charge/discharge test was conducted in the same manner as in Example 1. The charge/discharge performance is as shown in FIG. 5 (a); that is, the initial charge capacity was about 350 mAh/g, and the initial discharge capacity was about 130 mAh/g. These were remarkably higher than those measured in Comparative Example 2, described later, in which a starting material mixture before electric current sintering was used as a positive electrode active material (FIG. 5 (b); initial charge capacity: 0.6 mAh/g, and initial discharge capacity: 27 mAh/g).

The above results demonstrated that the utilization of lithium sulfide was greatly raised by combining lithium sulfide and carbon by electric current sintering under the conditions employed in the present invention.

Comparative Example 2

As with Example 2, 0.2 g of lithium sulfide (Li$_2$S) (average particle diameter: 16 µm) and 0.2 g of acetylene black (AB) (specific surface area: 68 m$^2$/g) (lithium sulfide:acetylene black (weight ratio)=1:1) were weighed in a glove box in an argon gas atmosphere. They were put in a zirconia pot, and sufficiently mixed by a planetary ball mill.

FIG. 4 (b) shows an X-ray diffraction pattern of the resulting mixture measured without electric current sintering. As shown in FIG. 4 (b), peaks derived from Li$_2$S and carbon are observed.

Moreover, the tap density of this mixture was measured in the same manner as in Example 1; the result was 0.35 g/cm$^3$, confirming that the mixture had a lower density than the composite obtained in Example 2.

Furthermore, the charge/discharge test was conducted in the same manner as in Example 1, except that this mixture was used as a positive electrode material. The charge/discharge performance is as shown in FIG. 5 (b); that is, the initial charge capacity was about 0.6 mAh/g, and the initial discharge capacity was about 27 mAh/g. The initial charge capacity and initial discharge capacity were both much lower, compared with the case where the composite obtained in Example 2 was used as a positive electrode active material. These results revealed that carbon was not firmly bonded to lithium sulfide only by mixing using a planetary ball mill, thus failing to enhance the utilization of the active material.

Example 3

The lithium sulfide-carbon composite was produced in the same manner as in Example 1, except that 0.1 g of lithium sulfide (Li$_2$S) (average particle diameter: 16 µm) and 0.2 g of acetylene black (AB) (specific surface area: 68 m$^2$/g) (lithium sulfide:acetylene black (weight ratio)=1:2) were used as starting materials.

Figure 6:
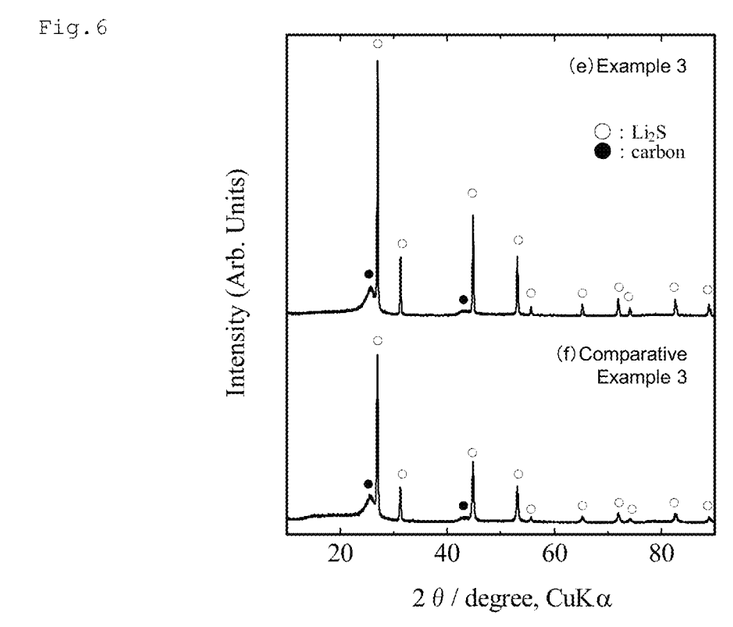
FIG. 6 shows X-ray diffraction patterns of samples obtained in Example 3 and Comparative Example 3.

FIG. 6 (a) shows an X-ray diffraction pattern of the obtained composite. As is clear from the X-ray diffraction pattern, peaks derived from Li$_2$S and carbon were observed, confirming that the obtained composite was composed of Li$_2$S and carbon. The fact that the weight change before and after electric current sintering treatment was about 4% suggests that the weight ratio of both components was maintained as they were mixed.

The tap density measured in the same manner as in Example 1 was 0.40 g/cm$^3$, which was higher than the tap density of a starting material mixture before electric current sintering (0.32 g/cm$^3$) measured in Comparative Example 3, described later. This result indicated that lithium sulfide and carbon were bonded to each other to achieve a higher density.

Figure 7:
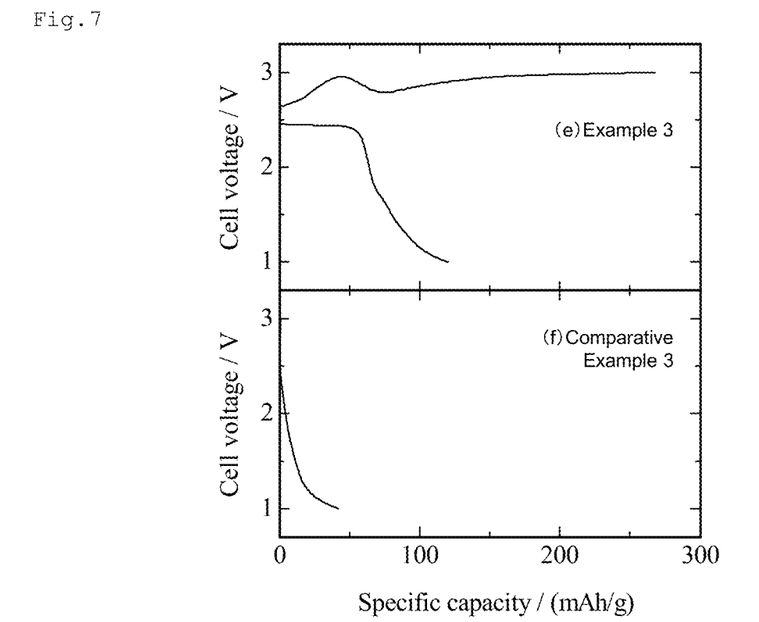
FIG. 7 shows charge/discharge performance of lithium ion secondary batteries comprising the samples obtained in Example 3 and Comparative Example 3 as positive electrode active materials.

Moreover, using the composite obtained in this manner as a positive electrode active material of a lithium ion secondary battery, the charge/discharge test was conducted in the same manner as in Example 1. The charge/discharge performance is as shown in FIG. 7 (a); that is, the initial charge capacity was about 270 mAh/g, and the initial discharge capacity was about 120 mAh/g. These were remarkably higher than those measured in Comparative Example 3, described later, in which a starting material mixture before electric current sintering was used as a positive electrode active material (FIG. 7 (b); initial charge capacity: 1 mAh/g, and initial discharge capacity: 40 mAh/g).

The above results demonstrated that the utilization of lithium sulfide was greatly raised by combining lithium sulfide and carbon by electric current sintering under the conditions employed in the present invention.

Comparative Example 3

As with Example 3, 0.1 g of lithium sulfide (Li$_2$S) (average particle diameter: 16 µm) and 0.2 g of acetylene black (AB) (specific surface area: 68 m$^2$/g) (lithium sulfide:acetylene black (weight ratio)=1:2) were weighed in a glove box in an argon gas atmosphere. They were put in a zirconia pot, and sufficiently mixed by a planetary ball mill.

FIG. 6 (b) shows an X-ray diffraction pattern of the resulting mixture measured without electric current sintering. As shown in FIG. 6 (b), peaks derived from $Li_2S$ and carbon are observed.

Moreover, the tap density of this mixture was measured in the same manner as in Example 1; the result was 0.32 g/cm³, confirming that the mixture had a lower density than the composite obtained in Example 3.

Furthermore, the charge/discharge test was conducted in the same manner as in Example 1, except that this mixture was used as a positive electrode active material. The charge/discharge performance is as shown in FIG. 7 (b); that is, the initial charge capacity was about 1 mAh/g, and the initial discharge capacity was about 40 mAh/g. The initial charge capacity and initial discharge capacity were both much lower, compared with the case where the composite obtained in Example 3 was used as a positive electrode active material. These results revealed that carbon was not firmly bonded to lithium sulfide only by mixing using a planetary ball mill, thus failing to enhance the utilization of the active material.

Example 4

A lithium sulfide-carbon composite was produced in the same manner as in Example 1, except that 0.4 g of lithium sulfide ($Li_2S$) (average particle diameter: 16 μm) and 0.1 g of acetylene black (AB) (specific surface area: 68 m²/g) (lithium sulfide:acetylene black (weight ratio)=4:1) were used as starting materials, and that the treatment temperature of the electric current sintering process was 1,200° C.

Figure 8:
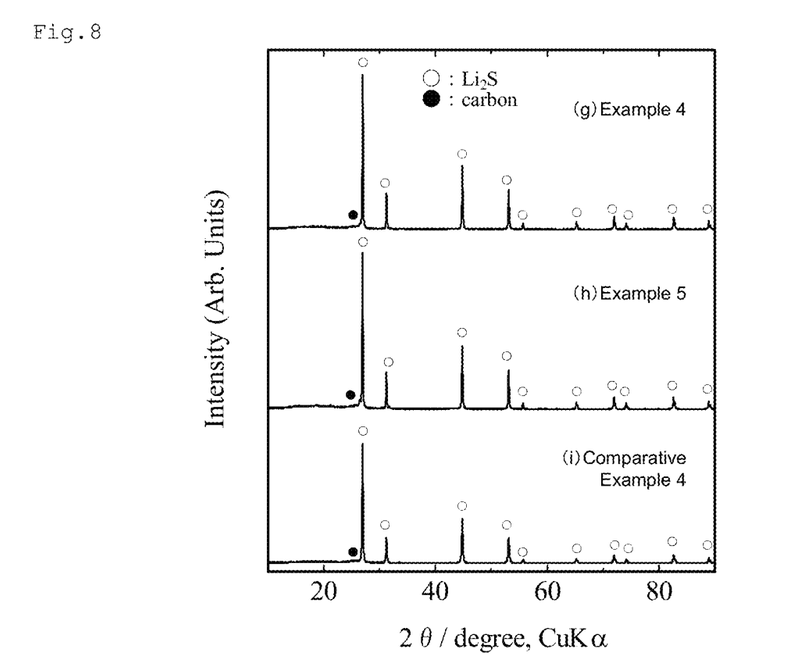
FIG. 8 shows X-ray diffraction patterns of samples obtained in Examples 4 and 5, and Comparative Example 4.

FIG. 8 (g) shows an X-ray diffraction pattern of the obtained composite. As is clear from the X-ray diffraction pattern, peaks derived from $Li_2S$ and carbon were observed, confirming that the obtained composite was composed of $Li_2S$ and carbon. The fact that the weight change before and after electric current sintering treatment was about 3% suggests that the weight ratio of both components was maintained as they were mixed.

Moreover, the tap density measured in the same manner as in Example 1 was 0.57 g/cm², which was much higher than the tap density of a starting material mixture before electric current sintering (0.40 g/cm²) measured in Comparative Example 4, described later. This result indicated that lithium sulfide and carbon were bonded to each other to achieve a higher density.

Figure 9:
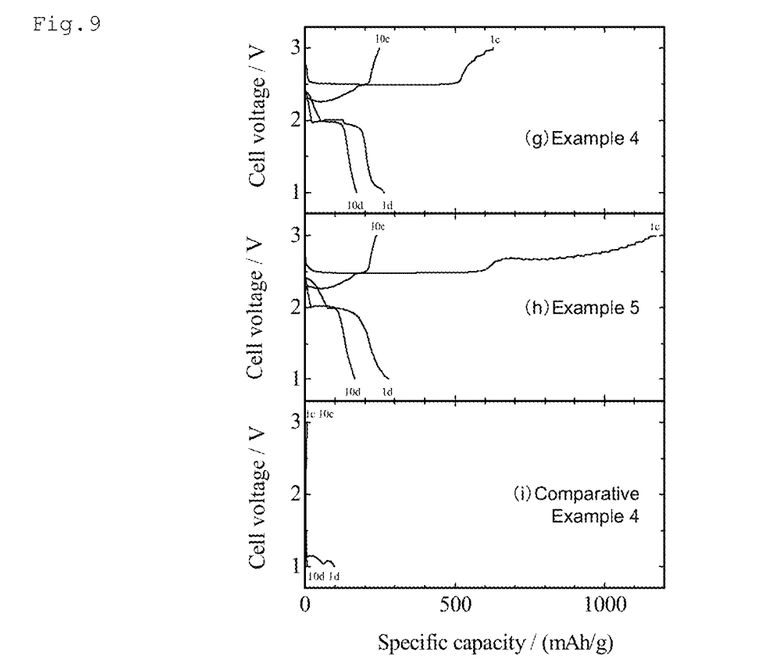
FIG. 9 shows charge/discharge performance of lithium ion secondary batteries comprising the samples obtained in Examples 4 and 5, and Comparative Example 4 as positive electrode active materials.

Furthermore, using the composite obtained in this manner as a positive electrode active material of a lithium ion secondary battery, the charge/discharge test was conducted in the same manner as in Example 1, except that 1 M LiTFSI/TEGDME (tetraethylene glycol dimethyl ether) was used as an electrolyte. The charge/discharge performance is as shown in FIG. 9 (g); that is, the initial charge capacity was about 630 mAh/g, the initial discharge capacity was about 260 mAh/g, and the discharge capacity after 10 cycles was about 170 mAh/g. These were remarkably higher than those measured in Comparative Example 4, described later, in which a starting material mixture before electric current sintering was used as a positive electrode active material (FIG. 9 (i); initial charge capacity: 0.9 mAh/g, initial discharge capacity: 98 mAh/g, and discharge capacity after 10 cycles: 6 mAh/g).

The above results demonstrated that the utilization of lithium sulfide was greatly raised by combining lithium sulfide and carbon by electric current sintering under the conditions employed in the present invention.

Example 5

A lithium sulfide-carbon composite was produced in the same manner as in Example 4, except that 0.4 g of lithium sulfide ($Li_2S$) (average particle diameter: 16 μm) and 0.1 g of acetylene black (AB) (specific surface area: 68 m²/g) (lithium sulfide:acetylene black (weight ratio)=4:1) were used as starting materials, and that the treatment temperature of the electric current sintering process was 1,000° C.

FIG. 8 (h) shows an X-ray diffraction pattern of the obtained composite. As is clear from the X-ray diffraction pattern, peaks derived from $Li_2S$ and carbon were observed, confirming that the obtained composite was composed of $Li_2S$ and carbon. The fact that the weight change before and after electric current sintering treatment was about 3% suggests that the weight ratio of both components was maintained as they were mixed.

Moreover, the tap density measured in the same manner as in Example 4 was 0.61 g/cm², which was much higher than the tap density of a starting material mixture before electric current sintering (0.40 g/cm²) measured in Comparative Example 4, described later. This result indicated that lithium sulfide and carbon were bonded to each other to achieve a higher density.

Furthermore, using the composite obtained in this manner as a positive electrode active material of a lithium ion secondary battery, the charge/discharge test was conducted in the same manner as in Example 4. The charge/discharge performance is as shown in FIG. 9 (h); that is, the initial charge capacity was about 1,170 mAh/g, the initial discharge capacity was about 280 mAh/g, and the discharge capacity after 10 cycles was about 170 mAh/g. These were remarkably higher than those measured in Comparative Example 4, described later, in which a starting material mixture before electric current sintering was used as a positive electrode active material (FIG. 9 (i); initial charge capacity: 0.9 mAh/g, initial discharge capacity: 98 mAh/g, and discharge capacity after 10 cycles: 6 mAh/g).

The above results demonstrated that the utilization of lithium sulfide was greatly raised by combining lithium sulfide and carbon by electric current sintering under the conditions employed in the present invention.

Comparative Example 4

As with Examples 4 and 5, 0.4 g of lithium sulfide ($Li_2S$) (average particle diameter: 16 μm) and 0.1 g of acetylene black (AB) (specific surface area: 68 m²/g) (lithium sulfide:acetylene black (weight ratio)=4:1) were weighed in a glove box in an argon gas atmosphere. They were put in a zirconia pot, and sufficiently mixed by a planetary ball mill.

FIG. 8 (i) shows an X-ray diffraction pattern of the resulting mixture measured without electric current sintering. As shown in FIG. 8 (i), peaks derived from $Li_2S$ and carbon are observed.

Moreover, the tap density of this mixture was measured in the same manner as in Examples 4 and 5; the result was 0.40 g/cm², confirming that the mixture had a lower density than the composites obtained in Examples 4 and 5.

Furthermore, the charge/discharge test was conducted in the same manner as in Examples 4 and 5, except that this mixture was used as a positive electrode material. The charge/discharge performance is as shown in FIG. 9 (i); that is, the initial charge capacity was about 0.9 mAh/g, the initial discharge capacity was about 98 mAh/g, and the discharge capacity after 10 cycles was 6 mAh/g. The initial charge capacity, initial discharge capacity, and discharge capacity after 10 cycles were all much lower, compared with the cases where the composites obtained in Examples 4 and 5 were used as positive electrode active materials. These results revealed that carbon was not firmly bonded to lithium sulfide only by mixing using a planetary ball mill, thus failing to enhance the utilization of the active material.

Example 6

A lithium sulfide-carbon composite was produced in the same manner as in Example 1, except that 0.2 g of lithium sulfide ($Li_2S$) (average particle diameter: 16 μm) and 0.2 g of acetylene black (AB) (specific surface area: 68 $m^2$/g) (lithium sulfide:acetylene black (weight ratio)=1:1) were used as starting materials, and that the treatment temperature of the electric current sintering process was 1,000° C.

Figure 10:
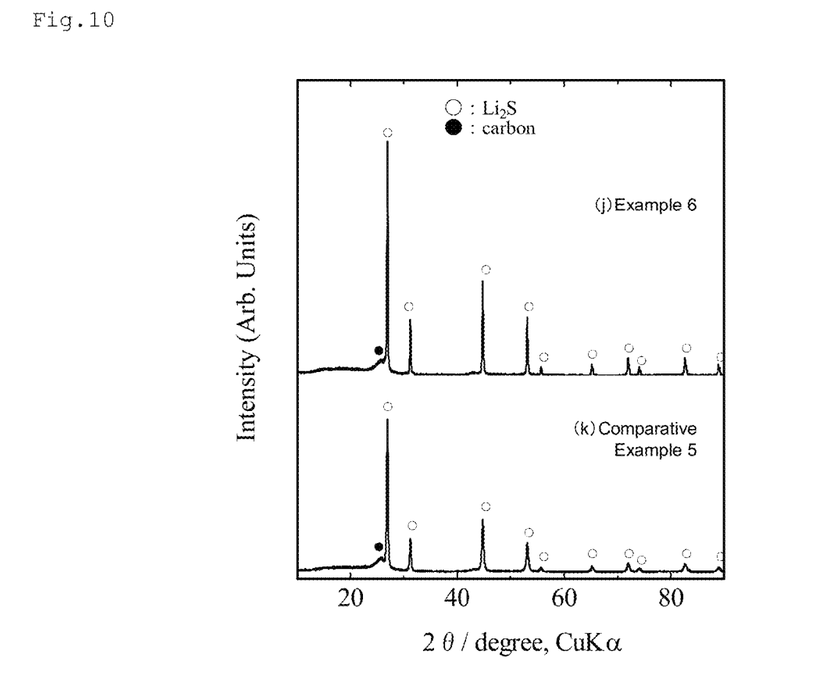
FIG. 10 shows X-ray diffraction patterns of samples obtained in Example 6 and Comparative Example 5.

FIG. 10 (j) shows an X-ray diffraction pattern of the obtained composite. As is clear from the X-ray diffraction pattern, peaks derived from $Li_2S$ and carbon were observed, confirming that the obtained composite was composed of $Li_2S$ and carbon. The fact that the weight change before and after electric current sintering treatment was about 3% suggests that the weight ratio of both components was maintained as they were mixed.

Moreover, the tap density measured in the same manner as in Example 1 was 0.54 g/$cm^3$, which was higher than the tap density of a starting material mixture before electric current sintering (0.35 g/$cm^3$) measured in Comparative Example 5, described later. This result indicated that lithium sulfide and carbon were bonded to each other to achieve a higher density.

Figure 11:
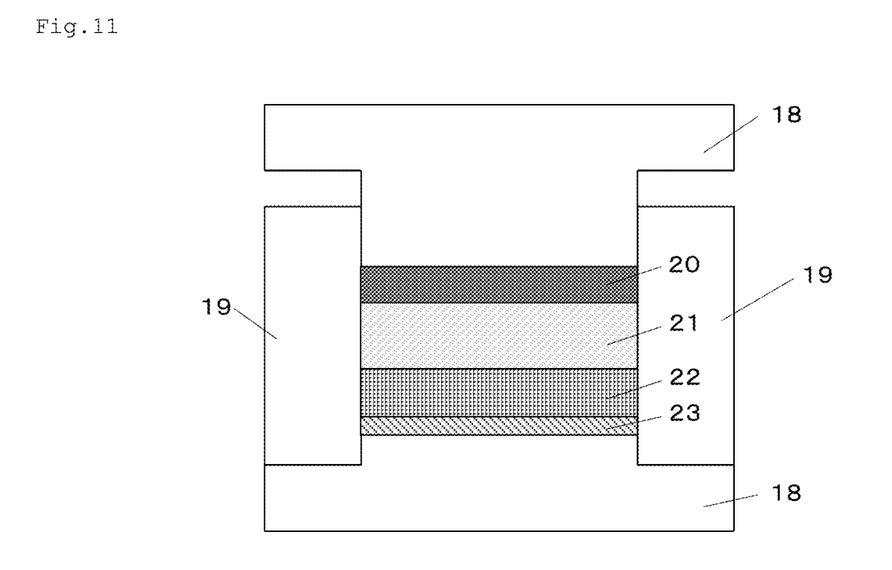
FIG. 11 schematically shows the structure of an all-solid-state lithium ion secondary battery.

Using the composite obtained in this manner as a positive electrode active material of a lithium ion secondary battery, and using a lithium ion conductive solid electrolyte, an all-solid-state lithium ion secondary battery was produced. The structure of the battery is shown in FIG. 11; a negative electrode, an electrolyte, a positive electrode, and a current collector are laminated in a PET tube, and the upper and lower sides of the laminate are sandwiched by metal punches. More specifically, a commercially available $Li_3PO_4$—$Li_2S$—$SiS_2$ glass electrolyte was used as a lithium ion conductive solid electrolyte, and a mixture of this electrolyte and the composite obtained by the above-described method (electrolyte:composite (weight ratio)=7:3) was used as a positive electrode layer. The positive electrode layer was laminated on the electrolyte layer, and an indium foil was further laminated as a negative electrode on the electrolyte layer side. Finally, a titanium foil was laminated as a current collector on the positive electrode layer side, and the entire laminate was sandwiched by metal punches, thereby producing an all-solid-state battery. The charge/discharge test was conducted by galvanostatic measurement at a current density of 11.7 mA/g and at a cutoff voltage of 0.4 to 3.5 V from the start of charging.

Figure 12:
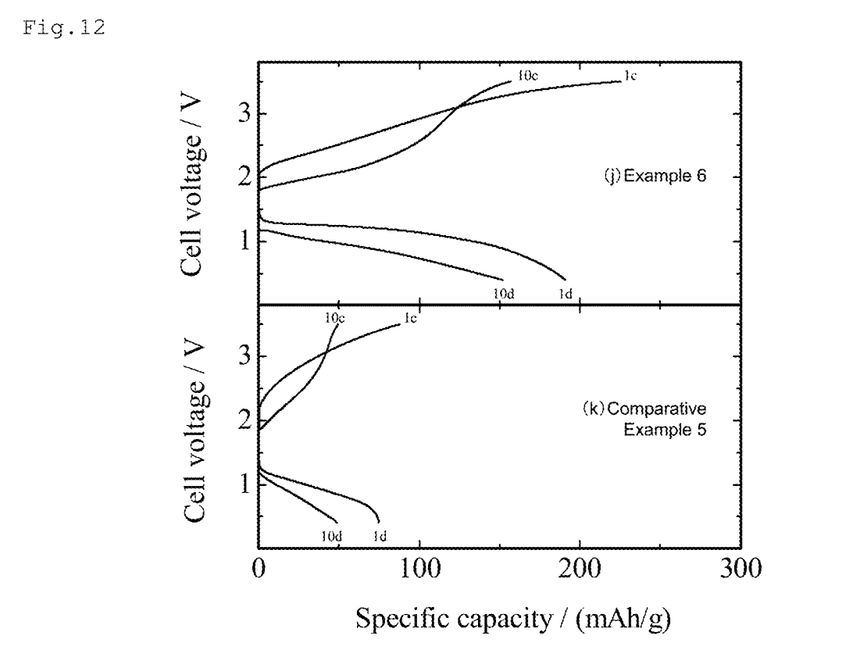
FIG. 12 shows charge/discharge performance of all-solid-state lithium ion secondary batteries comprising the samples obtained in Example 6 and Comparative Example 5 as positive electrode active materials.

The charge/discharge performance is as shown in FIG. 12 (j); that is, the initial charge capacity was about 230 mAh/g, the initial discharge capacity was about 190 mAh/g, and the discharge capacity after 10 cycles was about 150 mAh/g. These were remarkably higher than those measured in Comparative Example 5, described later, in which a starting material mixture before electric current sintering was used as a positive electrode active material (FIG. 12 (k); initial charge capacity: about 90 mAh/g, initial discharge capacity: about 80 mAh/g, and discharge capacity after 10 cycles: about 50 mAh/g). In addition, the charge/discharge efficiency in the initial cycle was about 85%, which was remarkably improved, compared with the cases where a liquid electrolyte was used (e.g., about 20 to 45% in Examples 1 to 5). This is presumably because the dissolution of the sulfur component, which may occur when using a liquid electrolyte, was suppressed during charging.

From the above results, it was confirmed that the use of a composite obtained by combining lithium sulfide and carbon by the process of the present invention as a positive electrode active material can greatly raise the utilization of lithium sulfide. It was also confirmed that the use of a lithium ion conductive solid electrolyte as an electrolyte can produce a lithium secondary battery having excellent charge/discharge efficiency.

Comparative Example 5

As with Example 6, 0.2 g of lithium sulfide ($Li_2S$) (average particle diameter: 16 μm) and 0.2 g of acetylene black (AB) (specific surface area: 68 $m^2$/g) (lithium sulfide:acetylene black (weight ratio)=1:1) were weighed in a glove box in an argon gas atmosphere. They were put in a zirconia pot, and sufficiently mixed by a planetary ball mill.

FIG. 10 (k) shows an X-ray diffraction pattern of the resulting mixture measured without electric current sintering. As shown in the diffraction pattern, peaks derived from $Li_2S$ and carbon are observed.

Moreover, the tap density of the mixture was measured in the same manner as in Example 6; the result was 0.35 g/$cm^3$, confirming that the mixture had a lower density than the composite obtained in Example 6.

An all-solid-state lithium ion secondary battery was produced in the same manner as in Example 6, except that this mixture was used as a positive electrode material, and the charge/discharge test was conducted. The charge/discharge performance is as shown in FIG. 12 (k); that is, the initial charge capacity was about 90 mAh/g, the initial discharge capacity was about 80 mAh/g, and the discharge capacity after 10 cycles was about 50 mAh/g. The initial charge capacity, initial discharge capacity, and discharge capacity after 10 cycles were all lower, compared with the case where the composite obtained in Example 6 was used as a positive electrode active material. These results revealed that carbon was not firmly bonded to lithium sulfide only by mixing using a planetary ball mill, thus failing to enhance the utilization of the active material.

REFERENCE SIGNS LIST

1. Electric current sintering apparatus
2. Sample
3. Die (conductive container)
4 and 5. Punches
6 and 7. Punch electrodes
8. Water-cooled vacuum chamber
9. Cooling water path
10 and 16. Water cooling mechanisms
11. Power source for sintering
12. Control unit
13. Pressurizing mechanism
14. Position measurement mechanism
15. Atmosphere control mechanism
17. Temperature measurement device
18. Metal punch
19. PET tube
20. Negative electrode
21. Lithium ion conductive solid electrolyte 22. Positive electrode
23. Current collector

The invention claimed is:

1. A process for producing a lithium sulfide-carbon composite, the process comprising:
   placing a mixture consisting of lithium sulfide and a carbon material having a specific surface area of 60 m$^2$/g or more in an electrically-conductive mold in a non-oxidizing atmosphere; and
   applying a pulsed direct current to the mold while pressurizing the mixture in a non-oxidizing atmosphere, thereby subjecting the lithium sulfide and the carbon material to heating reaction,
   wherein lithium sulfide-carbon composite comprises lithium sulfide and a carbon material bonded together, the composite having a carbon content of 15 to 70 weight %, and a tap density of 0.4 g/cm$^3$ or more when the carbon content is 30 weight % or more, or a tap density of 0.5 g/cm$^3$ or more when the carbon content is less than 30 weight %.

2. The process according to claim 1, wherein the carbon material is acetylene black, and the amount of carbon material used is 15 to 70 weight % based on the total amount of lithium sulfide and carbon material.

3. The process according to claim 1 or 2, wherein the reaction is carried out at 700 to 1,400° C. under a pressure of 10 MPa or greater.

* * * * *